Oct. 8, 1963         W. ZEIDLER         3,106,075
JOINT SHAFT WITH TORSIONAL FLEXIBILITY
Filed May 4, 1962                               2 Sheets-Sheet 1

Inventor:
Willi Zeidler
By
Watson, Cole, Grindle & Watson
Attys.

Oct. 8, 1963   W. ZEIDLER   3,106,075
JOINT SHAFT WITH TORSIONAL FLEXIBILITY
Filed May 4, 1962   2 Sheets-Sheet 2
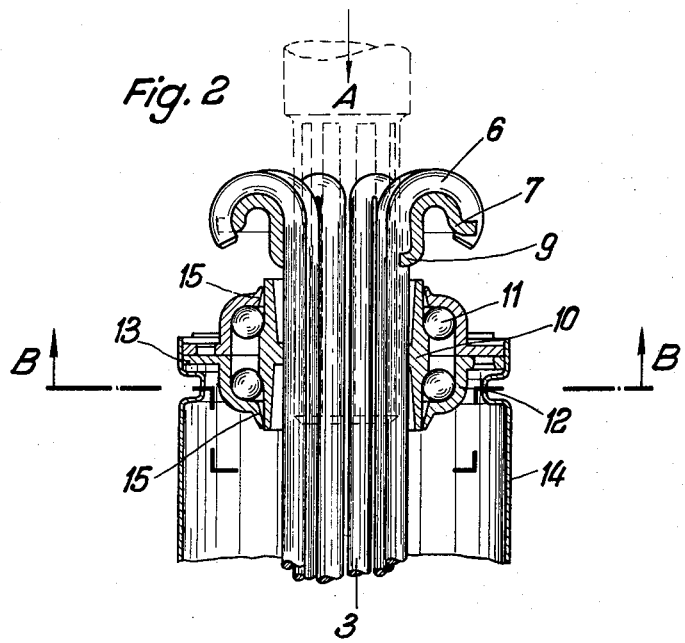
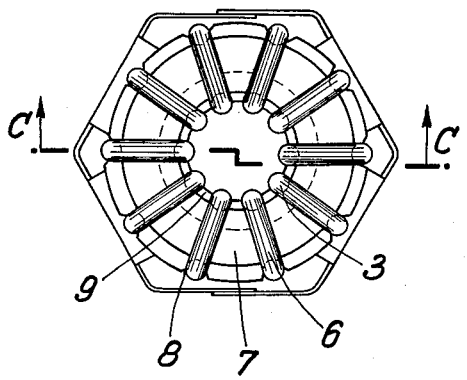
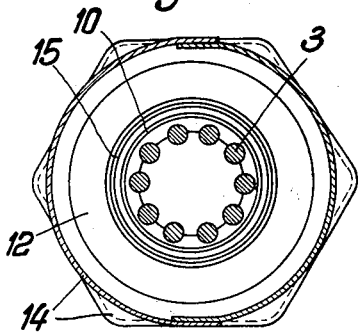
Inventor:
Willi Zeidler
By Watson Cole Grindle + Watson
Attys.

United States Patent Office 3,106,075
Patented Oct. 8, 1963

3,106,075
JOINT SHAFT WITH TORSIONAL FLEXIBILITY
Willi Zeidler, Dusseldorf, Germany, assignor to Firma Rheinmetall G.m.b.H., Dusseldorf, Germany
Filed May 4, 1962, Ser. No. 192,414
Claims priority, application Germany May 8, 1961
5 Claims. (Cl. 64—1)

The present invention relates to a resilient shaft coupling, more particularly for shafts requiring universal-joint couplings and having at least two guided parts which can be shifted axially with respect to one another.

It is an object of the present invention to provide a resilient shaft coupling which can be used with standard shafts and has the advantage, in particular, of being cheap and simple to manufacture and which exhibits high torsional elasticity.

According to the present invention, a resilient shaft coupling comprises a number of spring torsion bars, and means for holding the bars in a spaced configuration, the disposition and form of the springs being such that they can be engaged directly with splines on the ends of shafts to be coupled together.

The invention is moreover an improvement in or a modification of the invention described in the specification of co-pending patent application Serial No. 176,954, filed March 2, 1962.

An embodiment of the invention will now be described in more detail with reference to the accompanying drawings of which:

FIG. 2 shows a portion of FIG. 1, but on a larger scale, in section on the line C—C in FIG. 4, FIG. 3 is a cross-section on the line B—B of FIG. 2, and FIG. 4 is a view in the direction of the arrow A in FIG. 2.

Figure 1:
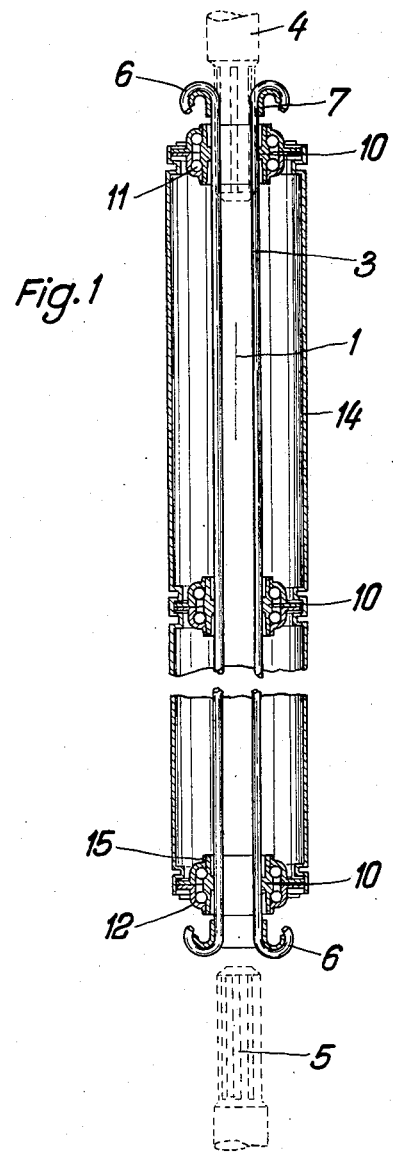
FIG. 1 is a general view of the embodiment, partly in section.

The shaft coupling illustrated in FIGS. 1 to 4 consists of a number of flexible, spring-torsion-bars 3 extending substantially parallel to the longitudinal axis 1 of aligned shafts 4, 5 to be coupled together. In the example shown in the drawing, the individual bars 3 are of round, transverse cross-section and, as will be seen from FIGS. 1 and 2, engage at their ends the teeth of the splines in the shafts 4, 5, so that, on the one hand, special connecting elements can be saved, while, on the other hand, the necessary free axial mobility of the bars 3 is ensured.

In FIG. 1, the splined shaft 5 is shown separated from the bars of the coupling. As shown in the drawings, the ends 6 of the spring-torsion-bars are bent into the form of a U and are connected or coupled to one another by way of a cup-shaped drawn disc 7. To that end, the disc 7 has notches 8, the width of each of which corresponds substantially with the diameter of the bars. On the inside, the bars 3 are likewise spaced by means of bridges 9 on the cup-shaped disc 7 as can be seen from FIG. 2.

In order to prevent an undesirable spreading of the spring-torsion-bars, retaining discs 10 are provided along the entire length of the bars, being suitably distributed. The retaining discs have bores, recesses or the like through which the individual bars 3 extend and in this way can be fixed at intervals within desired limits.

The retaining discs 10, which, for example, for the purpose of cheapening manufacture, could be made of plastic, form also the inner races of anti-friction bearings 11 of which the outer races 12, for instance likewise made of plastic, are supported by flanges 13 in a protective tube 14 encasing the bars 3 over the greater part of their length. Sealing lips 15 are provided by, for example, spraying, on the outer race 12 of the anti-friction bearing and have the function, on the one hand, of preventing losses of lubricant and, on the other hand, of affording protection against the penetration of dust.

The splined connection between the coupling and the shafts 4, 5 enables the latter to move axially whilst the flexible nature of the spring-torsion-bars 3 provides the freedom of movement required for a universal-joint type coupling.

The invention is not limited to the example illustrated and described which is merely intended to illustrate the basic idea of the invention. Thus, for example, the spring-torsion-bars could also be given any desired transverse cross-section, for instance they could also be adapted in form-locking manner to the profiles of the splined shaft or splined hub. If desired, the end portions only of the torsion bars may be of a transverse cross-section adapted to fit the splines on the shafts to be coupled together. Likewise, the retaining discs could also be supported with respect to the housing by way of plain bearings or the supporting action could also be carried out on an existing structural element, for example, the propeller shaft tunnel.

I claim:

1. A joint shaft with torsional flexibility comprising in combination a plurality of flexible, spring-torsion-bars, a plurality of retaining discs spaced along the length of the bars through which the latter pass and are thereby retained in a spaced configuration with their axes parallel, each bar having, at each end, a back-turned portion, interconnecting discs locked into said back-turned portions to retain the latter in a fixed spaced configuration, and, on said retaining and interconnecting discs, a bearing race, bearings on said races, and, an outer race, and, a tubular enclosure for said bars supported by said outer races.

2. A joint shaft with torsional flexibility comprising a plurality of flexible spring-torsion bars, a plurality of retaining discs spaced along the length of the bars through which the bars pass and are retained in a spaced configuration with their axes parallel to each other, each bar having at each end a back-turned portion, an interconnecting disc for each of the ends of the bars locked into said back-turned portions to retain the latter in a fixed spaced configuration, a bearing race on each retaining disc and having bearing members associated with each race, an outer race for the bearing members for each first-mentioned bearing race, and sealing lips for each outer race to prevent loss of lubricant and protect against penetration of dust.

3. A joint shaft according to claim 2, in which a casing is provided around the bars secured to the outer bearing races.

4. A joint shaft with torsional flexibility comprising a plurality of flexible spring-torsion bars, a plurality of retaining discs spaced along the length of the bars through which the bars pass and are retained in a spaced configuration with their axes parallel to each other, each bar having at each end a curved end directed outwardly relative to an axis of the shaft, a circular member in each of the ends of the bars and secured in the curved ends of the bars to lock the bars together and retain them in a fixed spaced configuration, each disc having an inner bearing race, an outer bearing race for each inner bearing race and having roller members between the races, and an enclosing member for the bars secured to the outer bearing races.

5. A joint shaft according to claim 4, in which sealing lips are provided for each outer race to protect the bearing against the penetration of dust.

References Cited in the file of this patent

UNITED STATES PATENTS

| | | |
|---|---|---|
| 306,472 | Feith | Oct. 14, 1884 |
| 1,640,670 | Schaeffer | Apr. 30, 1927 |
| 1,865,330 | McLeod | June 28, 1932 |
| 2,793,512 | Larsen | May 28, 1957 |
| 2,809,029 | Christoph | Oct. 8, 1957 |
| 3,038,323 | Wallman | June 12, 1962 |